(12) United States Patent
Yegorin et al.

(10) Patent No.: US 11,265,277 B2
(45) Date of Patent: Mar. 1, 2022

(54) DYNAMIC NOTIFICATION GROUPS

(71) Applicant: International Business Machines Corporation, Armonk, NY (US)

(72) Inventors: Anton Yegorin, Dublin (IE); Stephen W. O'Donovan, Douglas (IE)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 16/180,187

(22) Filed: Nov. 5, 2018

(65) Prior Publication Data

US 2020/0145358 A1 May 7, 2020

(51) Int. Cl.
| | |
|---|---|
| *H04L 12/58* | (2006.01) |
| *H04L 29/08* | (2006.01) |
| *H04L 51/00* | (2022.01) |
| *G06Q 50/00* | (2012.01) |
| *H04L 51/52* | (2022.01) |
| *H04L 67/306* | (2022.01) |
| *G06F 3/0481* | (2022.01) |
| *H04L 51/226* | (2022.01) |
| *G06N 20/00* | (2019.01) |

(52) U.S. Cl.
CPC ............ *H04L 51/14* (2013.01); *G06F 3/0481* (2013.01); *G06N 20/00* (2019.01); *G06Q 50/01* (2013.01); *H04L 51/26* (2013.01); *H04L 51/32* (2013.01); *H04L 67/306* (2013.01)

(58) Field of Classification Search
CPC ....... H04L 51/14; H04L 51/32; H04L 67/306; H04L 51/26; H04L 67/24; H04L 51/08; G06N 20/00; G06Q 50/01; G06Q 10/10; G06F 3/0481
See application file for complete search history.

(56) References Cited

U.S. PATENT DOCUMENTS

| | | |
|---|---|---|
| 7,769,395 B2 | 8/2010 | Fiatal et al. |
| 8,683,355 B1 | 3/2014 | Gailloux et al. |

(Continued)

FOREIGN PATENT DOCUMENTS

JP  2007188310 A  7/2007

OTHER PUBLICATIONS

Erickson et al., "A Persistent Chat Space for Work Groups: The Design, Evaluation and Deployment of Loops", Proceedings of the 6th conference on Designing Interactive systems, Jun. 26-28, 2006, pp. 331-340.

(Continued)

*Primary Examiner* — Hitesh Patel
*Assistant Examiner* — Clifton Houston
(74) *Attorney, Agent, or Firm* — Stosch S. Sabo

(57) ABSTRACT

Techniques for dynamic notifications including generating a machine learning model based on user profiles of a collaboration application. The technique further including receiving a first message from input to a first user interface presenting the collaboration application and associated with a first user profile, the first message including first content and a domain specific language (DSL) condition. The technique further including generating a plurality of notification groups, presenting the plurality of notification groups, and receiving a selected notification group. The technique further includes sending the first content to each user profile in the selected notification group.

18 Claims, 5 Drawing Sheets

(56) References Cited

U.S. PATENT DOCUMENTS

| | | | |
|---|---|---|---|
| 2002/0099777 A1* | 7/2002 | Gupta | G06Q 10/107 |
| | | | 709/206 |
| 2007/0233785 A1 | 10/2007 | Abraham et al. | |
| 2008/0046930 A1* | 2/2008 | Smith | H04N 7/163 |
| | | | 725/46 |
| 2008/0114847 A1* | 5/2008 | Ma | G06Q 50/184 |
| | | | 709/206 |
| 2008/0235343 A1* | 9/2008 | Wilk | G06Q 10/10 |
| | | | 709/206 |
| 2011/0010182 A1* | 1/2011 | Turski | H04L 51/08 |
| | | | 705/1.1 |
| 2011/0110182 A1* | 5/2011 | Mott | B01F 7/1695 |
| | | | 366/282 |
| 2011/0306304 A1 | 12/2011 | Forutanpour et al. | |
| 2013/0097246 A1 | 4/2013 | Zifroni et al. | |
| 2013/0218885 A1 | 8/2013 | Satyanarayanan | |
| 2014/0019882 A1 | 1/2014 | Chew et al. | |
| 2014/0067955 A1* | 3/2014 | Christian | H04L 67/18 |
| | | | 709/204 |
| 2014/0181212 A1* | 6/2014 | Cong | G06F 16/9537 |
| | | | 709/204 |
| 2014/0213295 A1* | 7/2014 | Conklin | H04W 4/08 |
| | | | 455/456.2 |
| 2014/0280617 A1* | 9/2014 | Nilsson | H04L 51/32 |
| | | | 709/206 |
| 2015/0195356 A1* | 7/2015 | Kim | H04W 4/18 |
| | | | 709/217 |
| 2015/0263925 A1* | 9/2015 | Shivashankar | G06F 16/24578 |
| | | | 706/12 |
| 2016/0323390 A1* | 11/2016 | Han | H04L 51/046 |
| 2017/0024454 A1* | 1/2017 | Brunn | G06Q 50/01 |
| 2017/0185268 A1* | 6/2017 | Zeng | G06F 3/04845 |
| 2017/0310626 A1* | 10/2017 | Kataria | H04L 51/24 |
| 2017/0364702 A1* | 12/2017 | Goldfarb | H04L 63/14 |
| 2018/0011848 A1 | 1/2018 | Spataro et al. | |
| 2018/0176273 A1* | 6/2018 | McEvoy | G06Q 10/107 |
| 2018/0188935 A1* | 7/2018 | Singh | G06Q 10/107 |
| 2019/0037258 A1* | 1/2019 | Lewis | H04N 21/251 |
| 2019/0158484 A1* | 5/2019 | Grunewald | A63F 13/73 |
| 2019/0208372 A1* | 7/2019 | Yan | H04M 7/0048 |
| 2019/0236488 A1* | 8/2019 | Achan | H04L 67/26 |
| 2020/0034748 A1* | 1/2020 | Zaifman | G06Q 30/0251 |

OTHER PUBLICATIONS

Mell et al., "The NIST Definition of Cloud Computing", Recommendations of the National Institute of Standards and Technology, Sep. 2011, 7 pages.

* cited by examiner

DYNAMIC NOTIFICATION GROUPS

BACKGROUND

The present disclosure relates to notification groups, and, more specifically, to providing dynamic notifications in collaboration applications.

Collaboration applications can enable users to efficiently interact with one another. Interactions can include sharing information such as communications (e.g., messages, notes, text, etc.), documents (e.g., plans, drawings, outlines, presentations, worksheets, etc.), media (e.g., videos, photographs, audio, etc.) and/or other information.

SUMMARY

Aspects of the present disclosure are directed toward a computer-implemented method comprising generating a machine learning model based on user profiles in a collaboration application, respective user profiles storing location data, availability data, and history data. The method can further comprise receiving a first message from input to a first user interface presenting the collaboration application and associated with a first user profile, the first message including first content and a domain specific language (DSL) condition. The method further comprising generating a plurality of notification groups based on the first content, the DSL condition, and the machine learning model, where each notification group comprises a plurality of user profiles. The method can further comprise presenting, on the user interface, the plurality of notification groups. The method can further comprise receiving, in response to presenting the plurality of notification groups, a selected notification group based on input to the first user interface. The method can further comprise sending the first content to each user profile in the selected notification group.

Further aspects of the present disclosure are directed toward a system and computer program product with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
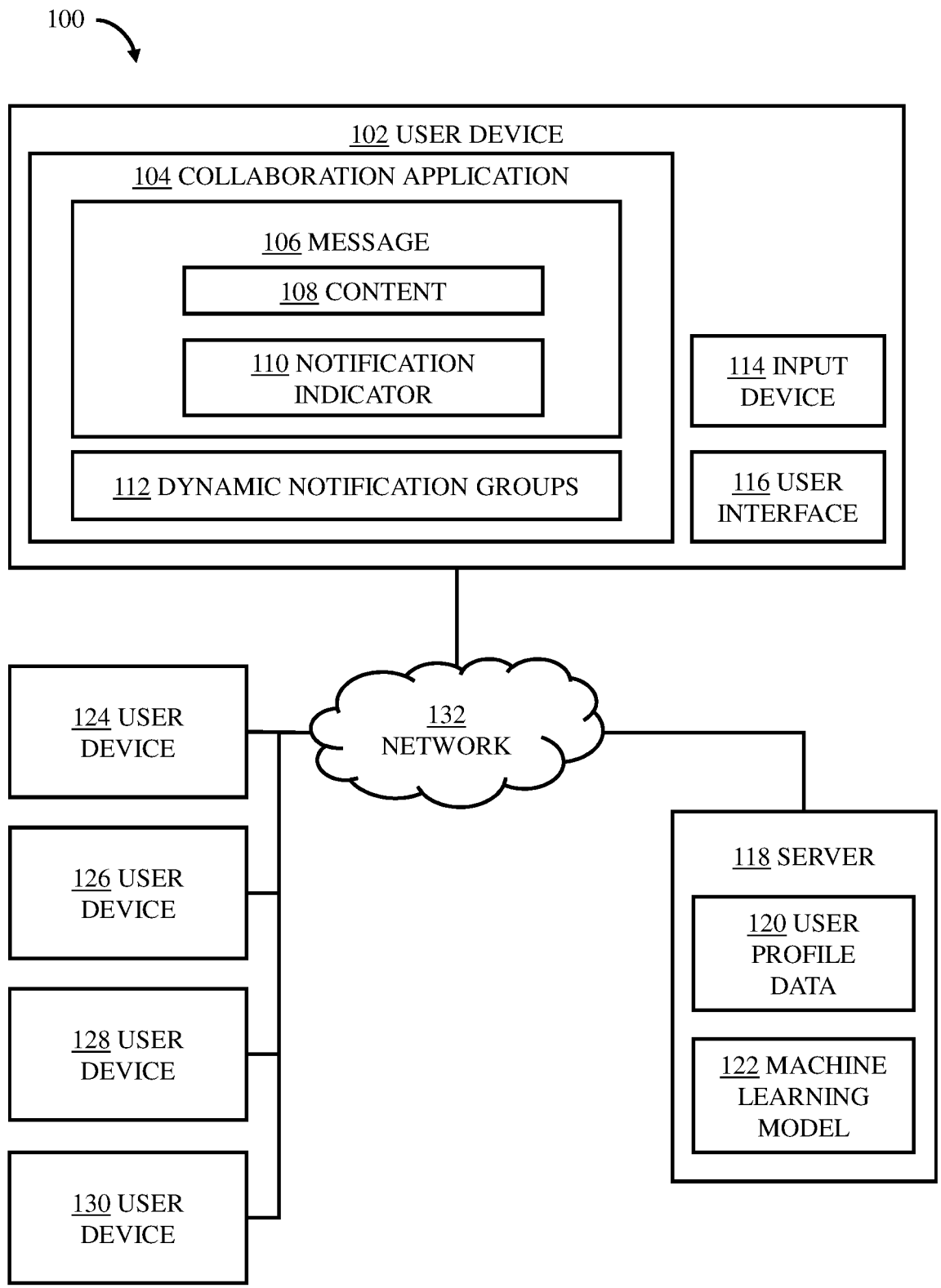
FIG. 1 illustrates an example collaboration environment, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward notification groups, and, more specifically, to providing dynamic notifications in collaboration applications. While not limited to such applications, embodiments of the present disclosure may be better understood in light of the aforementioned context.

Collaboration applications notify other user profiles when a given user profile shares information. Notifications are typically provided using static rules. For example, all of a user's friends, connections, or contacts may be notified when a user posts an item using a collaboration application. In some situations, a subset of a user's contacts is notified, where the subset may belong to a predefined group (e.g., a team, a region, etc.). In other situations, a single contact, or a customized list of contacts, can be notified based on specific information provided by the user (e.g., using mentions such as atMentions that can be triggered by a symbol such as the "@" symbol followed by a user name).

However, static notifications as currently provided (e.g., predefined groups, individuals added one at a time, etc.) are inefficient. For example, a user wishing to notify a subset of contacts typically adds individuals from the desired subset of contacts one at a time until the user has manually created the subset of contacts. The subset of contacts may share various features such as, but not limited to, similar geographic region, similar job role, availability, and so on.

Aspects of the present disclosure improve usability of collaboration applications by providing dynamic notification groups that predict a user's preferred distribution group. Dynamic notification groups can be automatically generated groups, where the generated groups contain custom sets of users based on relevance factors that are explicitly articulated and/or derived from user input. Thus, aspects of the present disclosure provide relevant, customized notification groups to enable a user to efficiently share information using a collaboration application.

FIG. 1 illustrates an example collaboration environment 100, according to embodiments of the present disclosure. Collaboration environment 100 includes user devices 102, 124, 126, 128, and 130, and server 118 communicatively coupled by network 132.

User device 102 includes collaboration application 104. Collaboration application 104 can be any application useful for communicating, sharing, or otherwise collaborating with one or more other users. Collaboration application 104 can be primarily message-based (e.g., emails, text messages, notes, chats, reminders, voice messages, etc.), media-based (e.g., photographs, videos, audio recordings, etc.), content-based (e.g., worksheets, documents, presentations, engineering drawings, architectural drawings, software code compilations, etc.), a different type of collaboration application, or a combination of the aforementioned collaboration applications.

Collaboration application 104 can include, but is not limited to, Watson Workspace (a product of International Business Machines (IBM®) Corporation), products and/or functionality associated with products of companies such as, but not limited to, Facebook®, Twitter®, Instagram®, LinkedIn®, Snapchat®, Pinterest®, and Alphabet® (including, but not limited to, Google Hangouts® (a trademarked product of Google Inc. for downloadable software for publishing and sharing digital media and information via global computer and communication network), Google Docs, Gmail® (a trademarked product of Google Inc. for electronic mail services for data and voice; instant messaging services; provision of video conferencing services; text messaging services), and Google Drive).

Collaboration application 104 can also include products, functionalities, and/or capabilities related to messaging applications including, but not limited to, Slack® (a trademarked product of Slack Technologies, Inc. for downloadable mobile application featuring software for use in group communication, namely, postings, memoranda and instant messaging), Yammer® (a trademarked product of Yammer, Inc. for computer software for sending and receiving electronic messages), Skype® (a trademarked product of Microsoft Corporation for computer software, namely, software for the transmission, recording, reproduction, display, organization, management, manipulation and review of messages, text, images, files, audio, video and audio-visual content and other data for the facilitation of communications between two or multiple users via computer networks), HipChat® (a trademarked product of HipChat, Inc. for computer software platforms for instant messaging), Confide® (a trademarked product of Confide, Inc. for computer software for mobile phones, portable media players, computers, handheld computers and other mobile computing devices, namely, software for sending digital photos, videos, images and text to others via a global computer network), Chanty® (a trademarked product of Chanty, Inc. for computer software platforms for instant messaging and group communication), and Trello® (a trademarked product of Trello, Inc. for computer software for use on computers and mobile devices for the creation of lists and checklists).

Collaboration application 104 can also include products, functionalities, and/or capabilities related to design applications such as Invision® (a trademarked product of InvisionApp Inc. for hosting and maintaining an on-line web site for others for collaboration and display of website wireframe, page schematic, screen blueprint and website prototype development projects), Mural (a product of Tactivos, Inc.), and Cage (a product of CageApp, LLC).

Collaboration application 104 can also include products, functionalities, and/or capabilities related to storage and sharing applications including DropBox® (a trademarked product of DropBox Inc. for providing online non-downloadable software for uploading and transferring files), products of Box, Inc., and OneDrive® (a trademarked product of Microsoft Corporation for computer software for receiving, displaying, storing, organizing and sharing with other users documents, sounds, music, videos, photographs, drawings, images and data stored electronically).

Collaboration application 104 can also include products, functionalities, and/or capabilities related to meeting hosting applications such as Cisco Webex® (a trademarked product of Cisco Technology, Inc. for downloadable computer software to facilitate the electronic transmission of information, data, documents, voice, and images over the Internet), Zoom® (a trademarked product of Zoom Video Communications, Inc. for downloadable software for use in the fields of audio teleconferencing, network conferencing services, instant messaging services, telephone conferencing services, teleconferencing services, telepresence conferencing services, text messaging services, video conferencing services, video communications services, video teleconferencing, videotext services, web conferencing services, and web messaging), and GoToMeeting® (a trademarked product of Citrix Online, LLC for computer software for transmitting data, graphics, audio and/or video over electronic communications networks).

The aforementioned products, companies, and/or functionalities are exemplary and provided to improve an appreciation of the breadth and depth of aspects of the present disclosure, however, the aforementioned example products, companies, and/or functionalities are not intended to limit the present disclosure, and the present disclosure is equally applicable to other collaboration applications 104 currently existing or later developed.

Collaboration application 104 can be used to generate a message 106. Message 106 can include content 108 such as, but not limited to, text, a file (e.g., a presentation), a photograph, a video, an audio recording, different content, or a combination of the aforementioned content.

Message 106 can also include notification indicator 110 that can optionally use domain specific language (DSL) conditions to indicate an audience for the message 106. In some embodiments, notification indicator 110 includes a mention indicator or an atMention indicator (e.g., an "@" symbol). In some embodiments, the notification indicator 110 includes DSL conditions indicating an audience based on location, importance, availability, timing, quantity, and/or other factors. Example DSL conditions associated with notification indicator 110 are discussed in more detail hereinafter.

Collaboration application 104 can be configured to generate dynamic notification groups 112 for selectively distributing content 108 to relevant other users using collaboration application 104. Dynamic notification groups 112 can be generated based on information in notification indicator 110 and/or based on machine learning model 122 of server 118. Machine learning model 122 can ingest user profile data 120, content 108, and/or notification indicator 110 and generate insights based on the ingested data. User profile data 120 can include, but is not limited to, location (e.g., time zone, region, address, state, current location, etc.), job role (e.g., title, function, grade, band, peers, managers, reports, etc.), availability (e.g., online, offline, away, in a meeting, do not disturb, etc.), history (e.g., previous messages, previous notification groups, etc.), contacts, and so on.

Machine learning model 122 can execute any number of machine learning algorithms such as, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning model 122 can be configured to perform machine learning using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Machine learning model 122 can likewise include natural language processing (NLP) functionality. NLP includes syntactic analysis functionality such as, but not limited to, parsing (e.g., dependency parsing, constituency parsing, etc.), part-of-speech tagging, sentence boundary disambiguation, word segmentation, and/or other syntactic functionality. NLP also includes semantic analysis functionality such as relationship extraction, sentiment analysis, topic recognition, word sense disambiguation, and other semantic functionality. Collectively, NLP can be used to generate insights from content 108 in message 106 and/or from user profile data 120. Machine learning model 122 can generate predictions for message 106 related to importance, urgency, confidentiality, privacy, topic, region, project, and so on. Machine learning model 122 can use the generated predictions to generate dynamic notification groups 112.

Dynamic notification groups 112 can provide improved usability, improved efficiency, and/or improved relevance of messages, media, and/or content distributed from user device 102 using collaboration application 104. Dynamic notification groups 112 can include a subset of users of collaboration application 104 that constitute a preferred audience for the content 108 distributed in message 106 from user device 102. Users in the subset of users of collaboration application 104 included in one or more of the dynamic notification groups 112 can be determined to have relevance to the content 108 distributed from user device 102 based on numerous factors such as, but not limited to, geographic location, time zone, job role, job responsibility, job hierarchy, address, availability (e.g., online, offline, etc.), and/or other factors that can be discovered by using machine learning model 122 and/or based on DSL conditions contained in the notification indicator 110.

Various DSL conditions can be related to location conditions, availability conditions, importance conditions, timing conditions, quantity conditions, and other conditions.

A notification indicator 110 including one or more location DSL conditions can be, for example, "@local", "@<country>-<city>", "@in:<country>-<city>", "@at:<office>", "@at:localrestaurant_name>", "@<time_zone>", and so on. Thus, a notification indicator 110 including DSL conditions can include country names, city names, business names, time zones, and so on and can be initiated using an "in" command, "at" command, or no command. Location DSL conditions can use location data stored in user profile data 120 of server 118. Location data can be derived from information such as, but not limited to hypertext markup language (HTML) 5 location, application program interface (API) geolocation service, promptLocation commands, or a location derived from NLP processing of recent messages sent by various users.

Availability DSL conditions can refer to an online status, offline status, or a different availability status. For example, notification indicator 110 can include an online status indicator such as "@online" or "@on". Alternatively, notification indicator 110 can include an offline status indicator such as "@offline" or "@off". Status indicators can be retrieved from user profile data 120 where it can be stored as a code (e.g., "on", "off", etc.) or implied from recent activity (e.g., a determination if the user interface presenting the collaboration application 104 is in sleep mode, if the user interface presenting the collaboration application 104 has been idle above a time threshold, etc.).

Timing DSL conditions can be used to send message 106 to a dynamic notification group 112 at (or within) a certain time. Timing DSL conditions can also be used to automatically delete a message after a certain amount of time. For example, a time range label can be used such as "range:<date_time1>-<date_time2>" or a time fraction label can be used such as "from:<date_time1>, to:<date_time2>". The "range" command can indicate that the message appear between date_time1 and date_time2. After date_time2, the message 106 can be automatically deleted. The "from" command can cause the message 106 to be sent at date_time1, and the "to" command can cause the message 106 to be deleted at or after date_time2. Thus, timing DSL conditions can be used to define lifespans of messages.

Importance DSL conditions can be used to indicate an importance or an urgency of message 106 when sent to one or more other user profiles. For example, importance values can be "high importance", "normal importance", "for-your-information", and so on. An importance value can be defined in notification indicator 110 using, for example, "i:<importance_level>". As another example, an exclamation point "!" located in the notification indicator 110 can indicate high importance. As another example, "FYI" located in the notification indicator 110 can indicate normal or low importance.

Quantity DSL conditions can be used to control the number of users receiving the message 106. Quantity DSL conditions can use "<", ">", and/or "=" to control the quantity of other users receiving the message 106. Quantity DSL conditions can be useful for limiting dynamic notification groups 112 to a certain number of highest ranked (e.g., highest scored) matches.

Location DSL conditions, availability DSL conditions, timing DSL conditions, importance DSL conditions, and quantity DSL conditions can be used together or separately. Where the aforementioned conditions are used together, discrete conditions can be separated by a symbol (e.g., a backslash) in notification indicator 110. For example, a DSL condition related to location can be combined with a DSL condition related to availability such as "@in:est/online" to send the message 106 to users in the Eastern time zone that are online.

The aforementioned DSL conditions are example conditions, and other DSL conditions are also possible such as, but not limited to, conditions related to job type (e.g., "@managers"), conditions related to specific projects (e.g., "@projectABC"), and so on.

In some embodiments, machine learning model 122 automatically generates dynamic notification groups 112 in lieu of, or in combination with, the aforementioned DSL conditions. Machine learning model 122 can generate dynamic notification groups 112 using predictions derived from the machine learning model 122 regarding which users should receive message 106. In some embodiments, notification indicator 110 only includes a symbol such as, but not limited to, "@", and machine learning model 122 automatically generates one or more dynamic notification groups 112 to present to a user interface 116. The dynamic notification groups 112 can be presented in a format similar to the DSL format discussed above (e.g., the machine learning model 122 can predict a distribution group such as "@in:est/on/to:1 hr/!" and present this DSL condition code to the user interface 116), or the dynamic notification groups 112 can be presented by text indicating the nature of respective notification groups (e.g., "all online employees in your office building" or "all people who report to you" presented to the user interface 116).

User device 102 can further include input device 114 and user interface 116. Input device 114 can be, for example, a physical, virtual, or digital keyboard, a microphone, a camera, a video camera, or a different input device. User interface 116 can be any user interface capable of presenting information to a user (e.g., a screen, a speaker, etc.).

User device 102 can generally refer to a smartphone, a tablet, a laptop, a desktop, a wearable device, a gaming system, an augmented reality system, a virtual reality system, or a different user device capable of executing collaboration application 104.

User devices 124, 126, 128, and 130 can contain similar components as the components contained in user device 102, but those components are not explicitly shown. Likewise, each of user devices 124, 126, 128, and 130 can run collaboration application 104 and can receive messages if they are a part of a selected dynamic notification group 112. As will be appreciated by one skilled in the art, although five user devices are shown in collaboration environment 100, some embodiments can be realized with hundred, thousands, tens of thousands, or more user devices in a collaboration environment 100.

Network 132 can be a physical and/or virtual network that permanently and/or intermittently communicatively couples user devices 102, 124, 126, 128, 130, and server 118. In some embodiments, collaboration application 104 is downloaded to user device 102 from server 118 via network 132.

For clarity, an example will now be given in the context of FIG. 1, however, this example is provided for explanatory purposes and is not intended to limit the present disclosure.

As an example, a user can include notification indicator 110 that indicates that the user of user device 102 wants message 106 (e.g., a reminder about an upcoming meeting in forty-five minutes) to go to all coworkers that are online in California for the next hour. Due to the last-minute nature of the message, the user of user device 102 may wish that the message be sent with high importance so that it will appear at a top of notifications of any users receiving the message. Likewise, the user of user device 102 may wish the message 106 to be automatically deleted after one hour since it will no longer be relevant. Such a notification indicator 110 can be "@us-california/online/to:1h/!". Collaboration application 104 uses notification indicator 110 to determine, based on user profile data 120 and/or machine learning model 122 in server 118, that user device 124 and user device 126 are in California, while user device 128 and user device 130 are located elsewhere. The collaboration application 104 can further use user profile data 120 and/or machine learning model 122 in server 118 to determine that user device 124 is online while user device 126 is offline. As a result, collaboration application 104 can generate a dynamic notification group 112 (or collaboration application 104 can receive generated dynamic notification group 112 from machine learning model 122) including user device 124 based on user device 124 meeting the criteria in notification indicator 110. Message 106 can be sent to user device 124, and user device 124 can present the message 106 in accordance with the high importance indicator of the notification indicator 110 (e.g., the message can be presented at a top of an information feed on user device 124, the message can be sent with a push notification to a mobile device associated with user device 124, the message can be highlighted when presented on user device 124, etc.). After one hour, the message can be automatically deleted or otherwise removed from user device 124.

Figure 2:
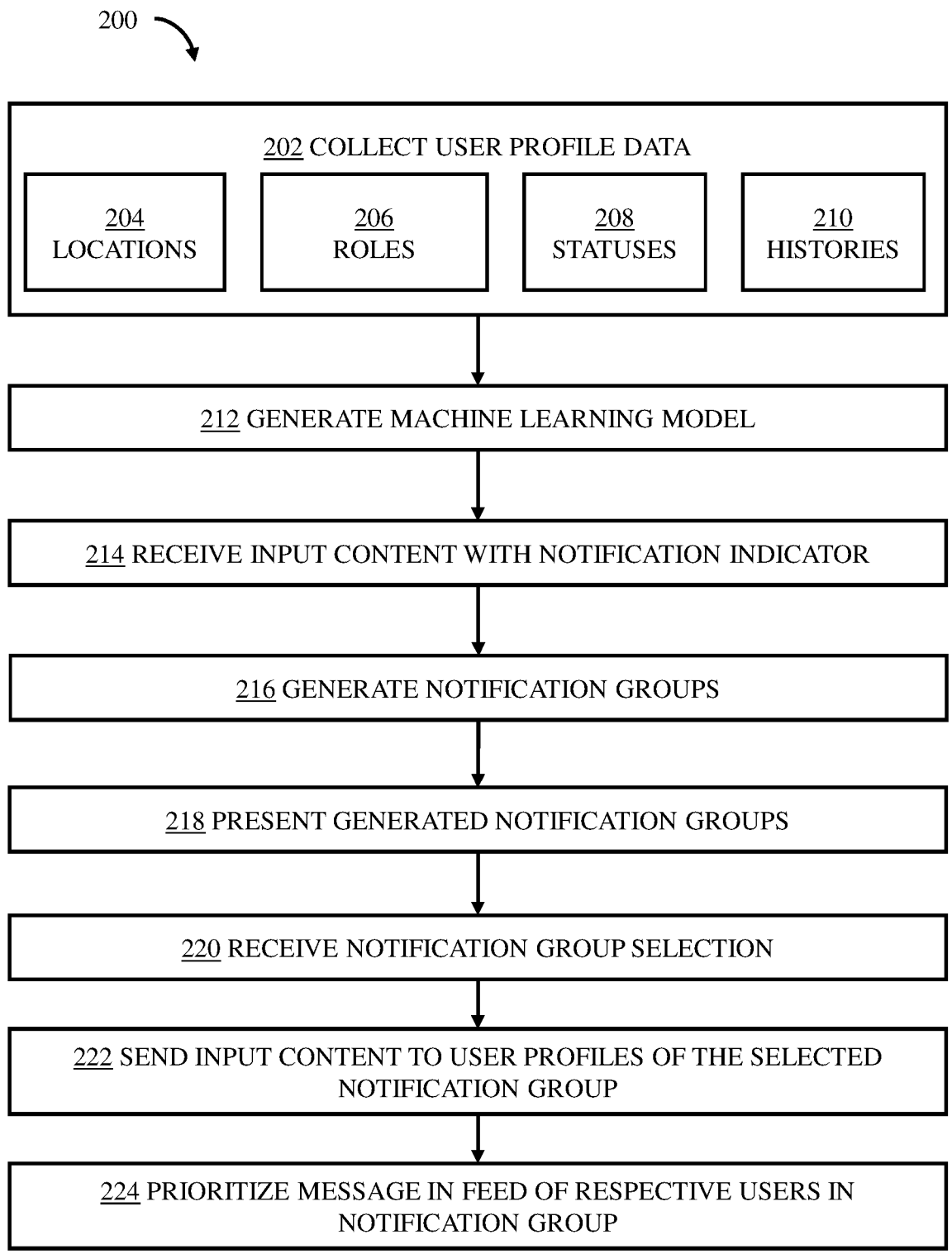
FIG. 2 illustrates a flowchart of an example method for using dynamic notification groups, in accordance with embodiments of the present disclosure.

FIG. 2 illustrates a flowchart of an example method for using dynamic notification groups, in accordance with embodiments of the present disclosure. The method 200 can be implemented by one or more processors, a notification manager (e.g., notification manager 300 of FIG. 3), a collaboration application (e.g., collaboration application 104 of FIG. 1), or a different configuration of hardware and/or software.

Operation 202 includes collecting user profile data such as locations 204, roles 206, statuses 208, and histories 210. Operation 202 can collect user profile data from user profiles of a collaboration application (e.g., user profile data 120 of FIG. 1). Operation 202 can occur repeatedly (e.g., approximately continuously) as user profile data is updated.

Locations 204 can refer to geographic locations, regions, time zones, addresses, location names (e.g., businesses, restaurants, campuses, etc.). Roles 206 can refer to job titles, job roles, project roles, interrelationships (e.g., peers, managers, reports, etc.) and so on. Statuses 208 can refer to online or offline status. In some embodiments, statuses 208 further include statuses such as "in a meeting", "away", "do not disturb", and so on. Histories 210 can include message histories and previously used notification groups. For example, histories 210 can include transcripts of previous chats, previously sent content, and so on.

Operation 212 includes generating a machine learning model using the data collected in operation 202. Any number of machine learning models can be used, as previously discussed with respect to machine learning model 122 of FIG. 1. Operation 212 can include updating a previously generated machine learning model with new information (e.g., updated user profile data 120 of FIG. 1).

Operation 214 includes receiving input content with a notification indicator. In some embodiments, the input content is consistent with content 108 of FIG. 1 and the notification indicator is consistent with notification indicator 110 of FIG. 1. The input content can be text, a photograph, a video, a recording, a file, different content, or a combination of the aforementioned content. The notification indicator can be a sign or symbol (e.g., an "@" symbol) or a functionality for custom notification (e.g., a button for generating dynamic notification groups). Although not explicitly shown, content and notification indicator can be input to the machine learning model generated in operation 212 and the machine learning model can output predicted importance, urgency, timing, confidentiality, privacy, topic, and other predictions related to the context of the content.

Operation 216 includes generating notification groups such as dynamic notification groups 112 of FIG. 1. Notification groups can be generated based on DSL conditions embedded in the notification indicator and/or based on the machine learning model generated in operation 212. The notification groups comprise groups of one or more user profiles believed to be a desired audience for the input content received in operation 214.

Operation 218 includes presenting the notification groups generated in operation 216 to a user interface (e.g., user interface 116 of FIG. 1). The notification groups can be presented adjacent to the notification indicator, adjacent to the content received in operation 214, as a drop-down list, on a side-bar, or in a different configuration on the user interface.

Operation 220 includes receiving a notification group selection (e.g., a selected notification group of the plurality of notification groups presented on operation 218). The selected notification group can be selected based on user input (e.g., a click, tap, voice command, etc.).

Operation 222 includes sending the input content to user profiles contained in the selected notification group. In some embodiments, operation 222 delays sending according to a timing indicator. In some embodiments, operation 222 otherwise customizes the sending according to parameters in the selected notification group.

Operation 224 includes prioritizing the message in information feeds of respective user profiles in the selected notification group. For example, for messages with an explicit "high importance" indicator or a predicted "high importance" level (e.g., based on NLP of the content), the message can be presented on a high-visibility area of the user interface of respective users in the selected notification group.

Figure 3:
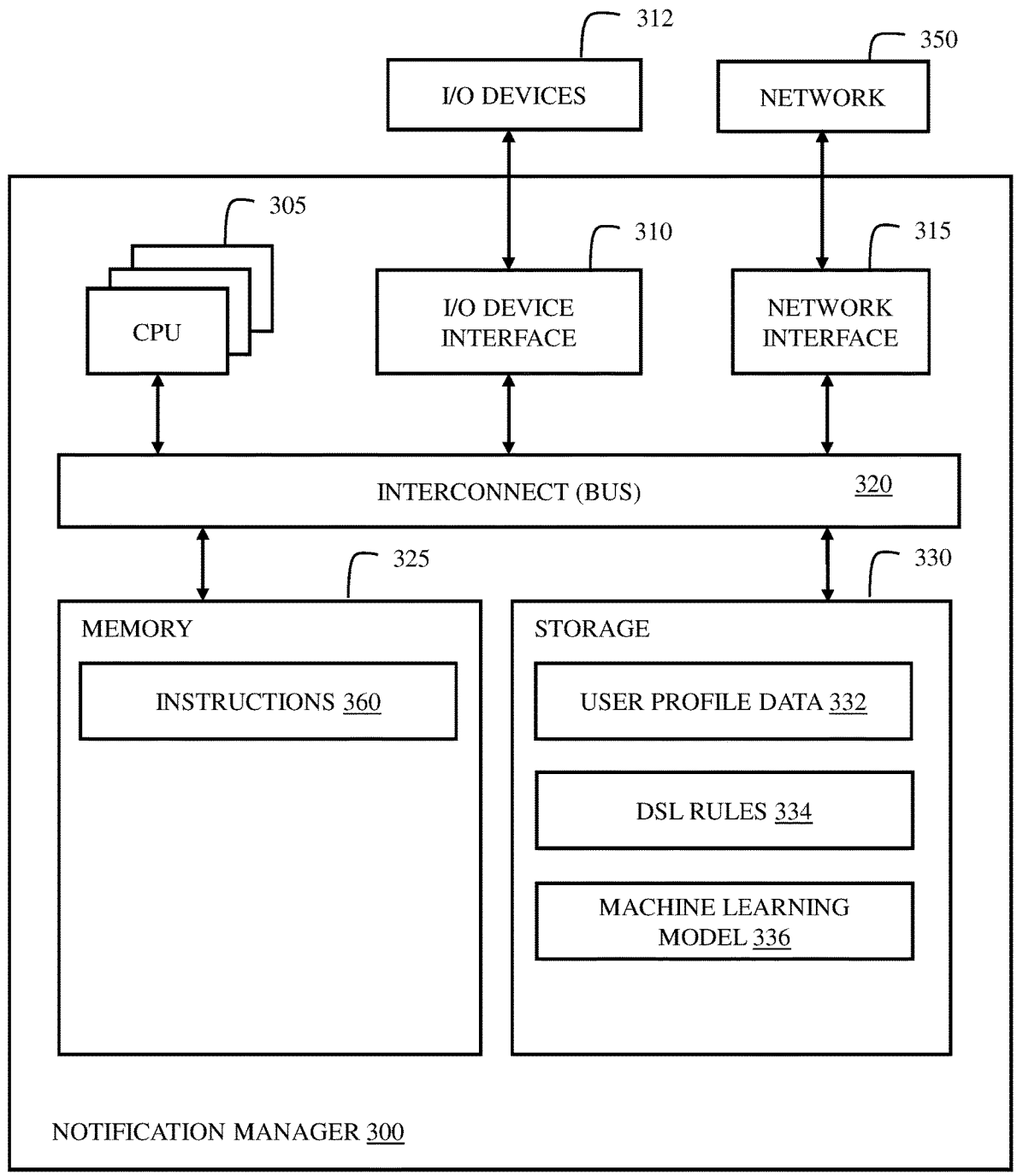
FIG. 3 illustrates a block diagram of an example notification manager, in accordance with embodiments of the present disclosure.

FIG. 3 illustrates a block diagram of an example notification manager 300 in accordance with some embodiments of the present disclosure. In various embodiments, notification manager 300 can perform the method described in FIG. 2. In some embodiments, notification manager 300 provides instructions for the method described in FIG. 2 to a client machine such that the client machine executes the method, or a portion of the method, based on the instructions provided by the notification manager 300. In some embodiments, notification manager 300 can execute operations in a physically constructed or virtually configured system in accordance with FIG. 1. In various embodiments, notification manager 300 is consistent with user device 102 or server 118 of FIG. 1.

The notification manager 300 includes a memory 325, storage 330, an interconnect (e.g., BUS) 320, one or more CPUs 305 (also referred to as processors 305 herein), an I/O device interface 310, I/O devices 312, and a network interface 315.

Each CPU 305 retrieves and executes programming instructions stored in the memory 325 or storage 330. The interconnect 320 is used to move data, such as programming instructions, between the CPUs 305, I/O device interface 310, storage 330, network interface 315, and memory 325. The interconnect 320 can be implemented using one or more busses. The CPUs 305 can be a single CPU, multiple CPUs, or a single CPU having multiple processing cores in various embodiments. In some embodiments, a CPU 305 can be a digital signal processor (DSP). In some embodiments, CPU 305 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 325 is generally included to be representative of a random access memory (e.g., static random access memory (SRAM), dynamic random access memory (DRAM), or Flash). The storage 330 is generally included to be representative of a non-volatile memory, such as a hard disk drive, solid state device (SSD), removable memory cards, optical storage, or flash memory devices. In an alternative embodiment, the storage 330 can be replaced by storage area-network (SAN) devices, the cloud, or other devices connected to the notification manager 300 via the I/O device interface 310 or a network 350 via the network interface 315.

In some embodiments, the memory 325 stores instructions 360 and the storage 330 stores user profile data 332, DSL rules 334, and machine learning model 336. However, in various embodiments, the instructions 360, user profile data 332, DSL rules 334, and machine learning model 336 are stored partially in memory 325 and partially in storage 330, or they are stored entirely in memory 325 or entirely in storage 330, or they are accessed over a network 350 via the network interface 315.

Instructions 360 can be processor-executable instructions for performing any portion of, or all of, any of the method of FIG. 2 and/or the functionality discussed in FIG. 1.

User profile data 332 can be consistent with user profile data 120 of FIG. 1 and/or the data collected in operation 202 of FIG. 2. User profile data 332 can refer to all data of all user profiles associated with a collaboration application (e.g., collaboration application 104 of FIG. 1).

DSL rules 334 can refer to syntax for encoding location conditions, availability conditions, timing conditions, importance conditions, quantity conditions, and/or other conditions into messages in a collaboration application.

Machine learning model 336 can refer to algorithms for predicting an audience of a particular message generated in a collaborative application. In some embodiments, machine learning model 336 is consistent with machine learning model 122 of FIG. 1 and/or the machine learning model generated in operation 212 of FIG. 2.

In various embodiments, the I/O devices 312 include an interface capable of presenting information and receiving input. For example, I/O devices 312 can present information to a user interacting with notification manager 300 and receive input from the user.

Notification manager 300 is connected to the network 350 via the network interface 315. Network 350 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
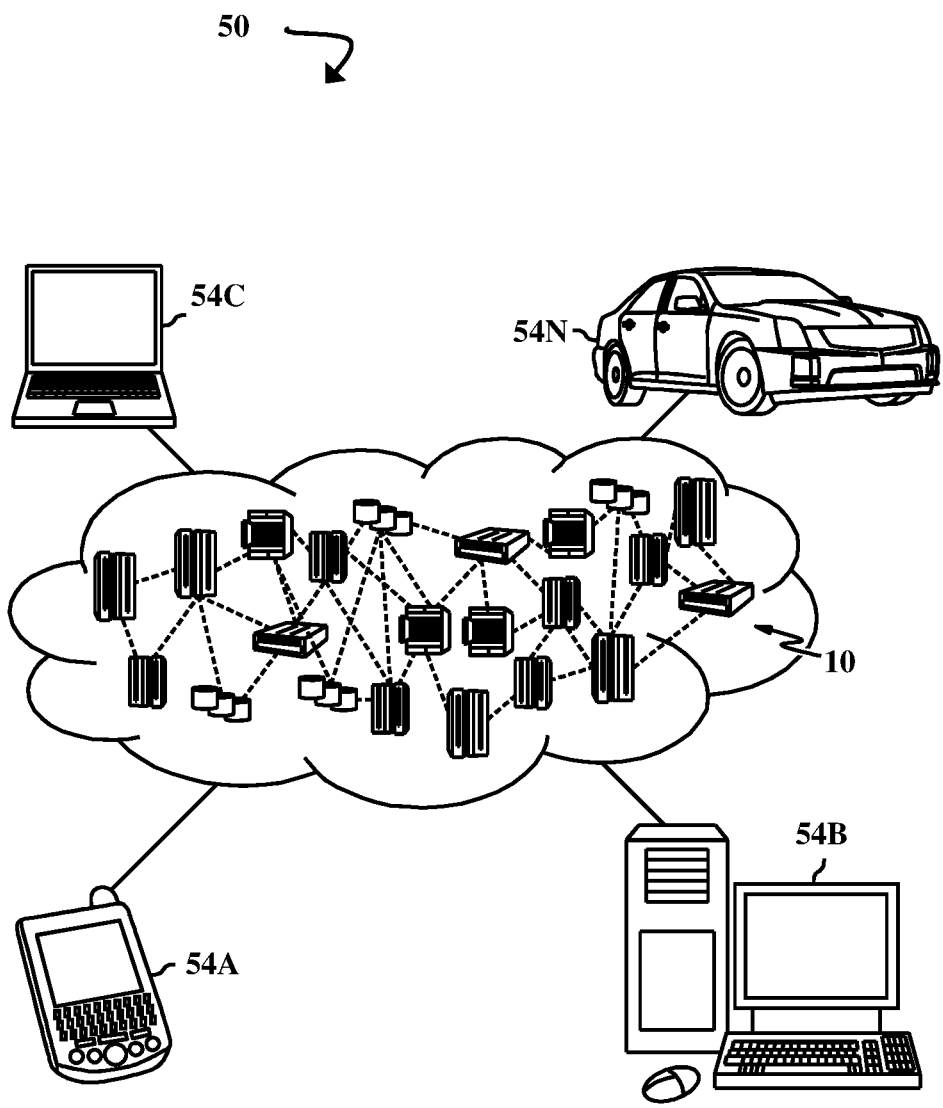
FIG. 4 depicts a cloud computing environment, according to some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
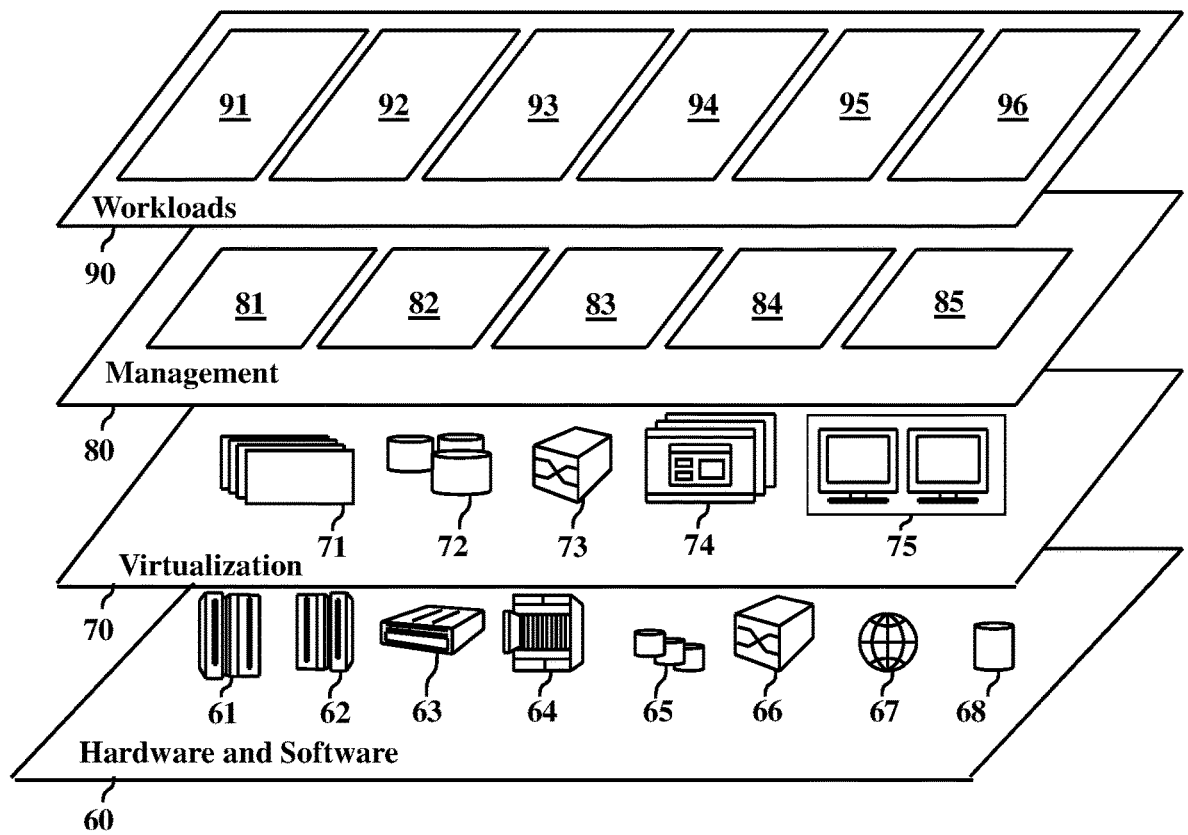
FIG. 5 depicts abstraction model layers, according to some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic messaging 96.

For clarity, several example embodiments of the present disclosure will now be discussed. A first embodiment includes generating a machine learning model based on user profiles in a collaboration application, respective user profiles storing location data, availability data, and history data. The first embodiment further includes receiving a first message from input to a first user interface presenting the collaboration application and associated with a first user profile, the first message including first content and a domain specific language (DSL) condition. The first embodiment further includes generating a plurality of notification groups based on the first content, the DSL condition, and the machine learning model, where each notification group comprises a plurality of user profiles. The first embodiment further includes presenting, on the user interface, the plurality of notification groups. The first embodiment further includes receiving, in response to presenting the plurality of notification groups, a selected notification group based on input to the first user interface. The first embodiment further including sending the first content to each user profile in the selected notification group.

A second embodiment including the aspects discussed above in the first embodiment includes the location data being based on hypertext markup language (HTML) 5 geolocation of various user devices hosting various user profiles.

A third embodiment including the aspects discussed above in the first embodiment includes the location data comprising respective address data associated with respective user profiles.

A fourth embodiment including the aspects discussed above in the first embodiment includes the plurality of notification groups being presented adjacent to the first message.

A fifth embodiment including the aspects discussed above in the first embodiment includes availability data that includes online status indicators and offline status indicators for respective user profiles.

A sixth embodiment including the aspects discussed above in the first embodiment includes history data that includes previous content sent by respective user profiles.

A seventh embodiment including the aspects discussed above in the first embodiment includes history data that includes previously used notification groups for respective user profiles.

An eighth embodiment including the aspects discussed above in the first embodiment includes the DSL condition comprising a quantity condition.

A ninth embodiment including the aspects discussed above in the first embodiment includes the DSL condition comprising a location condition.

A tenth embodiment including the aspects discussed above in the first embodiment includes the DSL condition comprising an availability condition.

An eleventh embodiment including the aspects discussed above in the first embodiment includes the DSL condition comprising a timing condition.

A twelfth embodiment including the aspects discussed above in the first embodiment includes the DSL condition comprising a priority condition.

A thirteenth embodiment including the aspects discussed above in the twelfth embodiment further includes providing the first content to a second user profile in the selected notification group by presenting the first content on a second user device associated with the second user profile, where the first content is presented above other content based on the priority condition of the first content being higher than the other content.

A fourteenth embodiment including the aspects discussed in the thirteenth embodiment further includes the DSL condition further including an expiration condition, and the fourteenth embodiment further configured to delete the first content from the second user profile in response to the first content satisfying the expiration condition.

A fifteenth embodiment including the aspects discussed in the first embodiment further includes inputting the first message to the machine learning model, receiving, from the machine learning model, a priority of the first message, and sending the first content to respective user profiles in the selected notification group, where the first content to presented according to the priority.

A sixteenth embodiment including the aspects discussed in the first embodiment, and where program instructions for performing the first embodiment were downloaded over a network from a remote data processing system.

A seventeenth embodiment including the aspects discussed in the first embodiment, where a computer-readable storage medium storing program instructions for the first embodiment is a server data processing system, and where the program instructions can be downloaded over a network to a remote data processing system for use in a remote computer-readable storage medium with the remote data processing system.

An eighteenth embodiment including the aspects discussed in the first embodiment, where program instructions for performing the first embodiment are provided as a service to one or more user devices in a networked environment.

The aforementioned embodiments are not necessarily mutually exclusive, and different embodiments can be combined in different combinations other than the combinations explicitly discussed unless the plain meaning of the text clearly indicates otherwise. Furthermore, the aforementioned embodiments are example embodiments, and do not represent all aspects of the present disclosure, nor do they represent all limitations potentially attributable to the present disclosure, nor do they require each limitation discussed in any single embodiment in order to fall within the spirit and scope of the present disclosure, nor do they imply any limitation to any particular statutory class that may be claimed, now or in the future.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 360 of FIG. 3 and/or any software configured to perform any subset of the method described with respect to FIG. 2, or to implement the functionality discussed in FIG. 1, in whole or in part) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method comprising:
   generating a machine learning model configured to generate dynamic notification groups based on location data, availability data, and history data of user profiles of a collaboration application;
   receiving a first message from input to a first user interface presenting the collaboration application and associated with a first user profile, the first message including first content and a domain specific language (DSL) condition, wherein the DSL condition comprises:
      a DSL quantity condition that controls a number of users of any generated dynamic notification groups;
      a DSL location condition specifying a geographic area for any generated dynamic notification groups;
      a DSL availability condition specifying a user availability of user profiles in any generated dynamic notification groups;
      a DSL timing condition specifying a first time to send the first content and a second time to delete the first content; and
      a DSL importance condition indicating an importance of the first content;
   generating, by the machine learning model, a plurality of dynamic notification groups based on the first content and the DSL condition, wherein each dynamic notification group comprises a plurality of highest-ranked user profiles that satisfy the number of users specified by the DSL quantity condition, the geographic area specified by the DSL location condition, the user availability specified by the DSL availability condition, the DSL timing condition, and the importance specified by the DSL importance condition;
   inputting the first message to the machine learning model;
   receiving, from the machine learning model, a priority of the first message and a confidentiality of the first message;
   presenting, on the user interface, the plurality of dynamic notification groups;
   receiving, in response to presenting the plurality of dynamic notification groups, a selected dynamic notification group based on input to the first user interface;
   sending the first content to each user profile in the selected dynamic notification group wherein the first content to presented according to the priority and the confidentiality; and
   automatically deleting the first content from each user profile of the selected dynamic notification group at the second time specified in the DSL timing condition.

2. The computer-implemented method according to claim 1, wherein the location data is based on hypertext markup language (HTML) 5 geolocation of various user devices hosting various user profiles.

3. The computer-implemented method according to claim 1, wherein the location data comprises respective address data associated with respective user profiles.

4. The computer-implemented method according to claim 1, wherein the plurality of dynamic notification groups are presented adjacent to the first message.

5. The computer-implemented method according to claim 1, wherein the availability data includes online status indicators and offline status indicators for respective user profiles.

6. The computer-implemented method according to claim 1, wherein the history data includes previous content sent by respective user profiles.

7. The computer-implemented method according to claim 1, wherein the history data includes previously used dynamic notification groups for respective user profiles.

8. The computer-implemented method according to claim 1, wherein the DSL quantity condition comprises at least one number and at least one symbol selected from a group consisting of: =, >, and <.

9. The computer-implemented method according to claim 1, wherein the DSL location condition is selected from a group consisting of: a country name, a city name, a business name, and a time zone.

10. The computer-implemented method according to claim 1, wherein the DSL availability condition comprises an online availability condition, wherein the online availability condition is based on an idle time of the collaboration application below a time threshold for the plurality of user profiles in each of the plurality of dynamic notification groups.

11. The computer-implemented method according to claim 1, wherein the DSL timing condition comprises a from date and time indicating when the first content is sent and a to date and time indicating when the first content is deleted.

12. The computer-implemented method according to claim 1, wherein the DSL importance condition comprises a high importance priority condition indicated by an exclamation point.

13. The computer-implemented method according to claim 12, further comprising:
providing the first content to a second user profile in the selected dynamic notification group by presenting the first content on a second user device associated with the second user profile, wherein the first content is presented above other content based on the high importance priority condition of the first content being higher than the other content.

14. The computer-implemented method according to claim 13, wherein the DSL condition further includes an expiration condition, wherein the method further comprises:
deleting the first content from the second user profile in response to the first content satisfying the expiration condition.

15. A system comprising:
a processor; and
a computer-readable storage medium communicatively coupled to the processor and storing program instructions which, when executed by the processor, cause the processor to perform a method comprising:
generating a machine learning model configured to generate dynamic notification groups based on location data, availability data, and history data of user profiles of a collaboration application;
receiving a first message from input to a first user interface presenting the collaboration application and associated with a first user profile, the first message including first content and a domain specific language (DSL) condition, wherein the DSL condition comprises:
a DSL quantity condition that controls a number of users of any generated dynamic notification groups;
a DSL location condition specifying a geographic area for any generated dynamic notification groups;
a DSL availability condition specifying a user availability of user profiles in any generated dynamic notification groups;
a DSL timing condition specifying a first time to send the first content and a second time to delete the first content; and
a DSL importance condition indicating an importance of the first content;
generating, by the machine learning model, a plurality of dynamic notification groups based on the first content and the DSL condition, wherein each dynamic notification group comprises a plurality of highest-ranked user profiles that satisfy the number of users specified by the DSL quantity condition, the geographic area specified by the DSL location condition, the user availability specified by the DSL availability condition, the DSL timing condition, and the importance specified by the DSL importance condition;
inputting the first message to the machine learning model;
receiving, from the machine learning model, a priority of the first message and a confidentiality of the first message;
presenting, on the user interface, the plurality of dynamic notification groups;
receiving, in response to presenting the plurality of dynamic notification groups, a selected dynamic notification group based on input to the first user interface;
sending the first content to each user profile in the selected dynamic notification group wherein the first content to presented according to the priority and the confidentiality; and
automatically deleting the first content from each user profile of the selected dynamic notification group at the second time specified in the DSL timing condition.

16. The system according to claim 15, wherein the program instructions were downloaded over a network from a remote data processing system.

17. The system according to claim 15, wherein the computer-readable storage medium storing the program instructions is a server data processing system, and wherein the program instructions are downloaded over a network to a remote data processing system for use in a remote computer-readable storage medium with the remote data processing system.

18. A computer program product comprising a computer-readable storage medium having program instructions embodied therewith, wherein the computer-readable storage medium is not a transitory signal per se, the program instructions executable by a processor to cause the processor to perform a method comprising:
generating a machine learning model configured to generate dynamic notification groups based on location data, availability data, and history data of user profiles of a collaboration application;
receiving a first message from input to a first user interface presenting the collaboration application and associated with a first user profile, the first message including first content and a domain specific language (DSL) condition, wherein the DSL condition comprises:
- a DSL quantity condition that controls a number of users of any generated dynamic notification groups;
- a DSL location condition specifying a geographic area for any generated dynamic notification groups;
- a DSL availability condition specifying a user availability of user profiles in any generated dynamic notification groups;
- a DSL timing condition specifying a first time to send the first content and a second time to delete the first content; and
- a DSL importance condition indicating an importance of the first content;

generating, by the machine learning model, a plurality of dynamic notification groups based on the first content and the DSL condition, wherein each dynamic notification group comprises a plurality of highest ranked user profiles that satisfy the number of users specified by the DSL quantity condition, the geographic area specified by the DSL location condition, the user availability specified by the DSL availability condition, the DSL timing condition, and the importance specified by the DSL importance condition;

inputting the first message to the machine learning model;

receiving, from the machine learning model, a priority of the first message and a confidentiality of the first message;

presenting, on the user interface, the plurality of dynamic notification groups;

receiving, in response to presenting the plurality of dynamic notification groups, a selected dynamic notification group based on input to the first user interface;

sending the first content to each user profile in the selected dynamic notification group wherein the first content to presented according to the priority and the confidentiality; and automatically deleting the first content from each user profile of the selected dynamic notification group at the second time specified in the DSL timing condition.

* * * * *